(12) United States Patent
Sheaffer et al.

(10) Patent No.: US 8,627,014 B2
(45) Date of Patent: Jan. 7, 2014

(54) MEMORY MODEL FOR HARDWARE ATTRIBUTES WITHIN A TRANSACTIONAL MEMORY SYSTEM

(75) Inventors: Gad Sheaffer, Haifa (IL); Shlomo Raikin, Geva Carmel (IL); Vadim Bassin, Raanana (IL); Ehud Cohen, Kiryat Motskin (IL); Oleg Margulis, Haifa (IL)

(73) Assignee: Intel Corporation, Santa Clara, CA (US)

( * ) Notice: Subject to any disclaimer, the term of this patent is extended or adjusted under 35 U.S.C. 154(b) by 680 days.

(21) Appl. No.: 12/346,539

(22) Filed: Dec. 30, 2008

(65) Prior Publication Data

US 2010/0169580 A1 Jul. 1, 2010

(51) Int. Cl.
*G06F 12/08* (2006.01)

(52) U.S. Cl.
USPC .............. 711/141; 711/145; 711/E12.026

(58) Field of Classification Search
USPC .......... 711/141, 100, 118, 151, 152, E12.002
See application file for complete search history.

(56) References Cited

U.S. PATENT DOCUMENTS

| | | | |
|---|---|---|---|
| 5,008,813 A | | 4/1991 | Crane et al. |
| 5,301,294 A | | 4/1994 | Kawai et al. |
| 6,216,200 B1 | * | 4/2001 | Yeager .................. 711/100 |
| 6,549,996 B1 | | 4/2003 | Manry, IV et al. |
| 2003/0014697 A1 | | 1/2003 | Hornung et al. |
| 2003/0154296 A1 | * | 8/2003 | Noguchi et al. ........... 709/229 |
| 2004/0064813 A1 | | 4/2004 | Neiger et al. |
| 2005/0060495 A1 | | 3/2005 | Pistoulet |
| 2005/0091459 A1 | | 4/2005 | Quach et al. |
| 2005/0160230 A1 | | 7/2005 | Doren et al. |
| 2005/0160232 A1 | | 7/2005 | Tierney et al. |
| 2005/0246487 A1 | | 11/2005 | Ergan |
| 2006/0085611 A1 | | 4/2006 | Ikeda et al. |
| 2007/0239942 A1 | | 10/2007 | Rajwar et al. |
| 2008/0005504 A1 | | 1/2008 | Barnes et al. |
| 2008/0126647 A1 | * | 5/2008 | Cometto et al. .......... 710/200 |
| 2008/0209133 A1 | | 8/2008 | Ozer et al. |
| 2008/0229070 A1 | * | 9/2008 | Charra et al. ............. 712/207 |
| 2009/0158006 A1 | | 6/2009 | Nam |
| 2011/0302446 A1 | | 12/2011 | Becker-Szendy et al. |

FOREIGN PATENT DOCUMENTS

WO 2010/077884 A2 7/2010

OTHER PUBLICATIONS

International Search Report and Written Opinion received for PCT Application No. PCT/US2009/068114, mailed on Aug. 9, 2010, 9 pages.

(Continued)

*Primary Examiner* — Pierre-Michel Bataille
(74) *Attorney, Agent, or Firm* — Blakely, Sokoloff, Taylor & Zafman LLP

(57) ABSTRACT

A method and apparatus for providing a memory model for hardware attributes to support transactional execution is herein described. Upon encountering a load of a hardware attribute, such as a test monitor operation to load a read monitor, write monitor, or buffering attribute, a fault is issued in response to a loss field indicating the hardware attribute has been lost. Furthermore, dependency actions, such as blocking and forwarding, are provided for the attribute access operations based on address dependency and access type dependency. As a result, different scenarios for attribute loss and testing thereof are allowed and restricted in a memory model.

29 Claims, 5 Drawing Sheets

(56) References Cited

OTHER PUBLICATIONS

Moir et al., "The Adaptive Transactional Memory Test Platform: A Tool for Experimenting with Transactional Code for Rock", Sun Micro Systems, In: The third annual ACM SIGPLAN workshop on transactional Computing, Feb. 2008, 18 pages.

Kumar et al., "Hybrid Transactional Memory", In proceedings of the eleventh ACM SIGPLAN symposium on Principles and practice of parallel programming, Mar. 2006, pp. 209-220.

International Preliminary Report on Patentability received for PCT Application No. PCT/US2009/068114, Mailed on Jul. 14, 2011, 6 pages.

Office Action mailed Jul. 20, 2012, Korean Patent Application No. 2011-7007724, 4 pages.

Office Action mailed May 14, 2012, Chinese Patent Application No. 200911000212.5, 6 pages.

* cited by examiner

MEMORY MODEL FOR HARDWARE ATTRIBUTES WITHIN A TRANSACTIONAL MEMORY SYSTEM

FIELD

This invention relates to the field of processor execution and, in particular, to execution of groups of instructions.

CROSS REFERENCE TO RELATED APPLICATIONS

This application is related to the following patent applications filed herewith: U.S. patent application Ser. No. 12/346,518 entitled "Registering a User-Handler in Hardware for Transactional Memory Event Handling," by Gad Sheaffer et al., filed on Dec. 30, 2008; U.S. patent application Ser. No. 12/346,543, entitled "Extending Cache Coherency Protocols to Support Locally Buffered Data," by Gad Sheaffer et al., filed on Dec. 30, 2008; U.S. patent application Ser. No. 12/346,530, entitled "Read and Write Monitoring Attributes in Transactional Memory (TM) Systems," by Gad Sheaffer et al., filed on Dec. 30, 2008; U.S. patent application Ser. No. 12/346,500, entitled "Metaphysical Address Space for Holding Lossy Meta-data in Hardware," by Gad Sheaffer et al., filed on Dec. 30, 2008.

BACKGROUND

Advances in semi-conductor processing and logic design have permitted an increase in the amount of logic that may be present on integrated circuit devices. As a result, computer system configurations have evolved from a single or multiple integrated circuits in a system to multiple cores and multiple logical processors present on individual integrated circuits. A processor or integrated circuit typically comprises a single processor die, where the processor die may include any number of cores or logical processors.

The ever increasing number of cores and logical processors on integrated circuits enables more software threads to be concurrently executed. However, the increase in the number of software threads that may be executed simultaneously have created problems with synchronizing data shared among the software threads. One common solution to accessing shared data in multiple core or multiple logical processor systems comprises the use of locks to guarantee mutual exclusion across multiple accesses to shared data. However, the ever increasing ability to execute multiple software threads potentially results in false contention and a serialization of execution.

For example, consider a hash table holding shared data. With a lock system, a programmer may lock the entire hash table, allowing one thread to access the entire hash table. However, throughput and performance of other threads is potentially adversely affected, as they are unable to access any entries in the hash table, until the lock is released. Alternatively, each entry in the hash table may be locked. Either way, after extrapolating this simple example into a large scalable program, it is apparent that the complexity of lock contention, serialization, fine-grain synchronization, and deadlock avoidance become extremely cumbersome burdens for programmers.

Another recent data synchronization technique includes the use of transactional memory (TM). Often transactional execution includes executing a grouping of a plurality of micro-operations, operations, or instructions. In the example above, both threads execute within the hash table, and their memory accesses are monitored/tracked. If both threads access/alter the same entry, conflict resolution may be performed to ensure data validity. One type of transactional execution includes Software Transactional Memory (STM), where tracking of memory accesses, conflict resolution, abort tasks, and other transactional tasks are performed in software, often without the support of hardware.

Another type of transactional execution includes a Hardware Transactional Memory (HTM) System, where hardware is included to support access tracking, conflict resolution, and other transactional tasks. As an example, hardware attributes may be included to support read monitoring, write monitoring, and buffering for transactional execution. However, instructions to set and read these attributes according to current memory ordering implementations may result in ordering violations. Furthermore, if the hardware attributes are held in a lossy manner, i.e. lost upon eviction/write-back, then read/test monitor instructions may see incorrect monitor data.

BRIEF DESCRIPTION OF THE DRAWINGS

The present invention is illustrated by way of example and not intended to be limited by the figures of the accompanying drawings.

DETAILED DESCRIPTION

In the following description, numerous specific details are set forth such as examples of specific hardware structures for transactional execution, specific types and implementations of access monitors, specific cache implementations, specific types cache coherency models, specific data granularities, specific types of attributes, and specific structures to detect dependencies etc. in order to provide a thorough understanding of the present invention. It will be apparent, however, to one skilled in the art that these specific details need not be employed to practice the present invention. In other instances, well known components or methods, such as implementation details of hardware monitors/attributes, demarcation of transactions, specific and alternative multi-core and multi-threaded processor architectures, specific compiler methods/implementations, and specific operational details of microprocessors, have not been described in detail in order to avoid unnecessarily obscuring the present invention.

The method and apparatus described herein are for providing a memory model for hardware attributes to support transactional execution. Specifically, the memory model is discussed in reference to an out-of-order processor including access buffers. In fact, FIGS. 2-4 refer to embodiments for modification of buffers, such as store buffers. However, the methods and apparatus for providing a memory model for hardware attributes is not so limited, as they may be implemented in any style of processor including any structures for handling accesses to hardware attributes.

Figure 1:
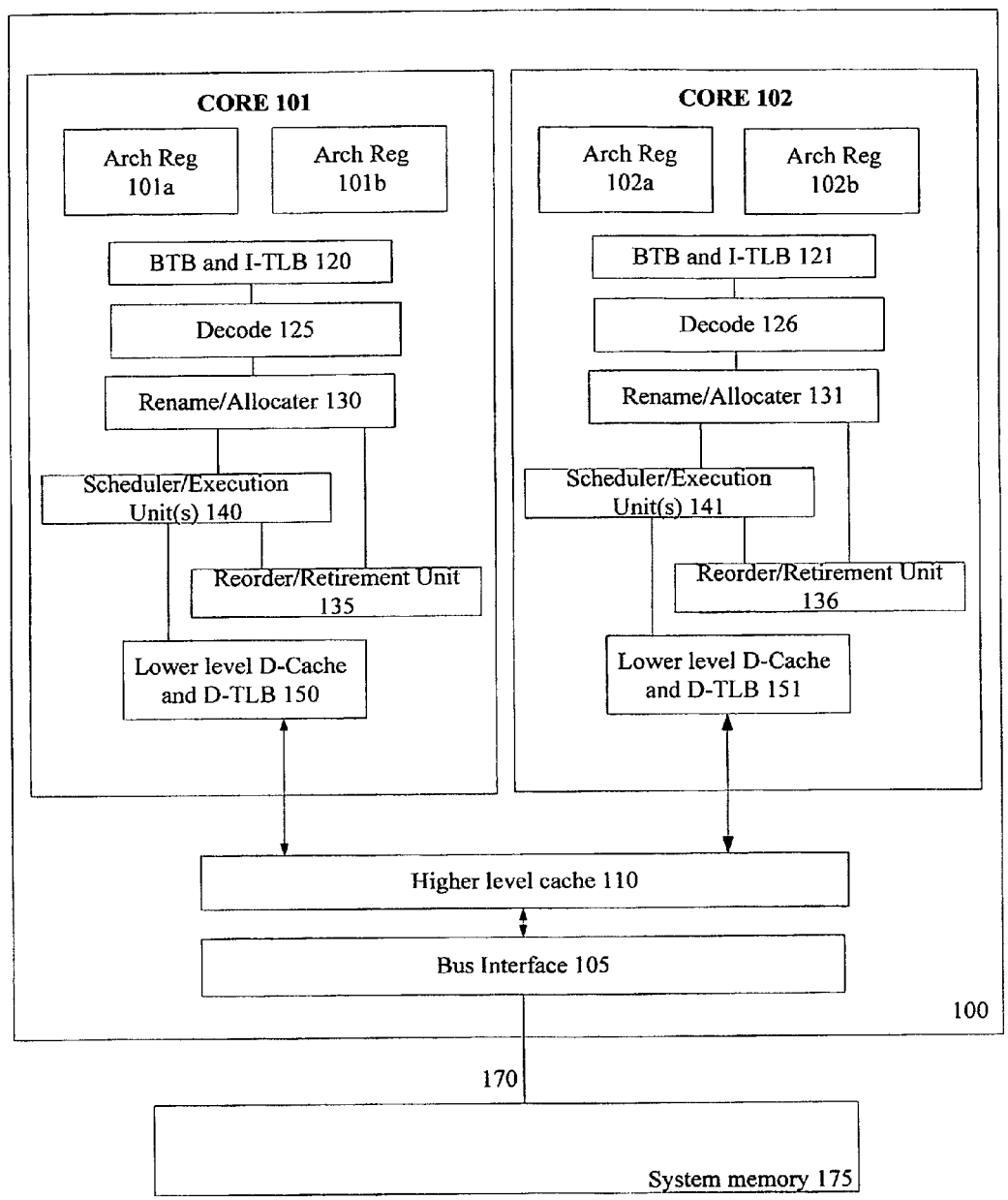
FIG. 1 illustrates an embodiment of a processor including multiple processing elements capable of executing multiple software threads concurrently.

Referring to FIG. 1, an embodiment of a processor capable of executing multiple threads concurrently is illustrated. Note, processor 100 may include hardware support for hardware transactional execution. Either in conjunction with hardware transactional execution, or separately, processor 100 may also provide hardware support for hardware acceleration of a Software Transactional Memory (STM), separate execution of a STM, or a combination thereof, such as a hybrid Transactional Memory (TM) system. Processor 100 includes any processor, such as a micro-processor, an embedded processor, a digital signal processor (DSP), a network processor, or other device to execute code. Processor 100, as illustrated, includes a plurality of processing elements.

In one embodiment, a processing element refers to a thread unit, a process unit, a context, a logical processor, a hardware thread, a core, and/or any other element, which is capable of holding a state for a processor, such as an execution state or architectural state. In other words, a processing element, in one embodiment, refers to any hardware capable of being independently associated with code, such as a software thread, operating system, application, or other code. A physical processor typically refers to an integrated circuit, which potentially includes any number of other processing elements, such as cores or hardware threads.

A core often refers to logic located on an integrated circuit capable of maintaining an independent architectural state wherein each independently maintained architectural state is associated with at least some dedicated execution resources. In contrast to cores, a hardware thread typically refers to any logic located on an integrated circuit capable of maintaining an independent architectural state wherein the independently maintained architectural states share access to execution resources. As can be seen, when certain resources are shared and others are dedicated to an architectural state, the line between the nomenclature of a hardware thread and core overlaps. Yet often, a core and a hardware thread are viewed by an operating system as individual logical processors, where the operating system is able to individually schedule operations on each logical processor.

Physical processor 100, as illustrated in FIG. 1, includes two cores, core 101 and 102, which share access to higher level cache 110. Although processor 100 may include asymmetric cores, i.e. cores with different configurations, functional units, and/or logic, symmetric cores are illustrated. As a result, core 102, which is illustrated as identical to core 101, will not be discussed in detail to avoid repetitive discussion. In addition, core 101 includes two hardware threads 101a and 101b, while core 102 includes two hardware threads 102a and 102b. Therefore, software entities, such as an operating system, potentially view processor 100 as four separate processors, i.e. four logical processors or processing elements capable of executing four software threads concurrently.

Here, a first thread is associated with architecture state registers 101a, a second thread is associated with architecture state registers 101b, a third thread is associated with architecture state registers 102a, and a fourth thread is associated with architecture state registers 102b. As illustrated, architecture state registers 101a are replicated in architecture state registers 101b, so individual architecture states/contexts are capable of being stored for logical processor 101a and logical processor 101b. Other smaller resources, such as instruction pointers and renaming logic in rename allocater logic 130 may also be replicated for threads 101a and 101b. Some resources, such as re-order buffers in reorder/retirement unit 135, ILTB 120, load/store buffers, and queues may be shared through partitioning. Other resources, such as general purpose internal registers, page-table base register, low-level data-cache and data-TLB 115, execution unit(s) 140, and portions of out-of-order unit 135 are potentially fully shared.

Processor 100 often includes other resources, which may be fully shared, shared through partitioning, or dedicated by/to processing elements. In FIG. 1, an embodiment of a purely exemplary processor with illustrative functional units/resources of a processor is illustrated. Note that a processor may include, or omit, any of these functional units, as well as include any other known functional units, logic, or firmware not depicted.

As illustrated, processor 100 includes bus interface module 105 to communicate with devices external to processor 100, such as system memory 175, a chipset, a northbridge, or other integrated circuit. Memory 175 may be dedicated to processor 100 or shared with other devices in a system. Higher-level or further-out cache 110 is to cache recently fetched elements from higher-level cache 110. Note that higher-level or further-out refers to cache levels increasing or getting further way from the execution unit(s). In one embodiment, higher-level cache 110 is a second-level data cache. However, higher level cache 110 is not so limited, as it may be associated with or include an instruction cache. A trace cache, i.e. a type of instruction cache, may instead be coupled after decoder 125 to store recently decoded traces. Module 120 also potentially includes a branch target buffer to predict branches to be executed/taken and an instruction-translation buffer (I-TLB) to store address translation entries for instructions.

Decode module 125 is coupled to fetch unit 120 to decode fetched elements. In one embodiment, processor 100 is associated with an Instruction Set Architecture (ISA), which defines/specifies instructions executable on processor 100. Here, often machine code instructions recognized by the ISA include a portion of the instruction referred to as an opcode, which references/specifies an instruction or operation to be performed.

In one example, allocator and renamer block 130 includes an allocator to reserve resources, such as register files to store instruction processing results. However, threads 110a and 101b are potentially capable of out-of-order execution, where allocator and renamer block 130 also reserves other resources, such as reorder buffers to track instruction results. Unit 130 may also include a register renamer to rename program/instruction reference registers to other registers internal to processor 100. Reorder/retirement unit 135 includes components, such as the reorder buffers mentioned above, load buffers, and store buffers, to support out-of-order execution and later in-order retirement of instructions executed out-of-order.

Scheduler and execution unit(s) block 140, in one embodiment, includes a scheduler unit to schedule instructions/operation on execution units. For example, a floating point instruction is scheduled on a port of an execution unit that has an available floating point execution unit. Register files associated with the execution units are also included to store information instruction processing results. Exemplary execution units include a floating point execution unit, an integer execution unit, a jump execution unit, a load execution unit, a store execution unit, and other known execution units.

Lower level data cache and data translation buffer (D-TLB) 150 are coupled to execution unit(s) 140. The data cache is to store recently used/operated on elements, such as data operands, which are potentially held in memory coherency states. The D-TLB is to store recent virtual/linear to physical address translations. As a specific example, a processor may include a page table structure to break physical memory into a plurality of virtual pages.

In one embodiment, processor 100 is capable of hardware transactional execution, software transactional execution, or a combination or hybrid thereof. A transaction, which may also be referred to as a critical or atomic section of code, includes a grouping of instructions, operations, or micro-operations to be executed as an atomic group. For example, instructions or operations may be used to demarcate a transaction or a critical section. In one embodiment, described in more detail below, these instructions are part of a set of instructions, such as an Instruction Set Architecture (ISA), which are recognizable by hardware of processor 100, such as decoders described above. Often, these instructions, once compiled from a high-level language to hardware recognizable assembly langue include operation codes (opcodes), or other portions of the instructions, that decoders recognize during a decode stage.

Typically, during execution of a transaction, updates to memory are not made globally visible until the transaction is committed. As an example, a transactional write to a location is potentially visible to a local thread, yet, in response to a read from another thread the write data is not forwarded until the transaction including the transactional write is committed. While the transaction is still pending, data items/elements loaded from and written to within a memory are tracked, as discussed in more detail below. Once the transaction reaches a commit point, if conflicts have not been detected for the transaction, then the transaction is committed and updates made during the transaction are made globally visible.

However, if the transaction is invalidated during its pendency, the transaction is aborted and potentially restarted without making the updates globally visible. As a result, pendency of a transaction, as used herein, refers to a transaction that has begun execution and has not been committed or aborted, i.e. pending.

A Software Transactional Memory (STM) system often refers to performing access tracking, conflict resolution, or other transactional memory tasks in or at least partially in software. In one embodiment, processor 100 is capable of executing a compiler to compile program code to support transactional execution. Here, the compiler may insert operations, calls, functions, and other code to enable execution of transactions.

A compiler often includes a program or set of programs to translate source text/code into target text/code. Usually, compilation of program/application code with a compiler is done in multiple phases and passes to transform hi-level programming language code into low-level machine or assembly language code. Yet, single pass compilers may still be utilized for simple compilation. A compiler may utilize any known compilation techniques and perform any known compiler operations, such as lexical analysis, preprocessing, parsing, semantic analysis, code generation, code transformation, and code optimization.

Larger compilers often include multiple phases, but most often these phases are included within two general phases: (1) a front-end, i.e. generally where syntactic processing, semantic processing, and some transformation/optimization may take place, and (2) a back-end, i.e. generally where analysis, transformations, optimizations, and code generation takes place. Some compilers refer to a middle end, which illustrates the blurring of delineation between a front-end and back end of a compiler. As a result, reference to insertion, association, generation, or other operation of a compiler may take place in any of the aforementioned phases or passes, as well as any other known phases or passes of a compiler. As an illustrative example, a compiler potentially inserts transactional operations, calls, functions, etc. in one or more phases of compilation, such as insertion of calls/operations in a front-end phase of compilation and then transformation of the calls/operations into lower-level code during a transactional memory transformation phase.

Nevertheless, despite the execution environment and dynamic or static nature of a compiler, the compiler, in one embodiment, compiles program code to enable transactional execution. Therefore, reference to execution of program code, in one embodiment, refers to (1) execution of a compiler program(s), either dynamically or statically, to compile main program code, to maintain transactional structures, or to perform other transaction related operations, (2) execution of main program code including transactional operations/calls, (3) execution of other program code, such as libraries, associated with the main program code, or (4) a combination thereof.

In one embodiment, processor 100 is capable of executing transactions utilizing hardware/logic, i.e. within a Hardware Transactional Memory (HTM) system. Numerous specific implementation details exist both from an architectural and microarchitectural perspective when implementing an HTM; most of which are not discussed herein to avoid unnecessarily obscuring the invention. However, some structures and implementations are disclosed for illustrative purposes. Yet, it should be noted that these structures and implementations are not required and may be augmented and/or replaced with other structures having different implementation details.

Accesses and requests may be made to data items both by local processing elements, as well as potentially by other processing elements. Without safety mechanisms in a transactional memory system, some of these accesses would potentially result in invalid data and execution, i.e. a write to data invalidating a read, or a read of invalid data. As a result, processor 100 potentially includes logic to track or monitor memory accesses to and from data items for identification of potential conflicts.

A data item or data element may include data at any granularity level, as defined by hardware, software or a combination thereof. A non-exhaustive list of examples of data, data elements, data items, or references thereto, include a memory address, a data object, a class, a field of a type of dynamic language code, a type of dynamic language code, a variable, an operand, a data structure, and an indirect reference to a memory address. However, any known grouping of data may be referred to as a data element or data item. A few of the examples above, such as a field of a type of dynamic language code and a type of dynamic language code refer to data structures of dynamic language code. To illustrate, dynamic language code, such as Java™ from Sun Microsystems, Inc, is a strongly typed language. Each variable has a type that is known at compile time. The types are divided in two categories—primitive types (boolean and numeric, e.g., int, float) and reference types (classes, interfaces and arrays). The values of reference types are references to objects. In Java™, an object, which consists of fields, may be a class instance or an array. Given object a of class A it is customary to use the notation A::x to refer to the field x of type A and a.x to the field x of object a of class A. For example, an expression may be couched as a.x=a.y+a.z. Here, field y and field z are loaded to be added and the result is to be written to field x.

Therefore, monitoring/buffering memory accesses to data items may be performed at any of data level granularity. For example, in one embodiment, memory accesses to data are monitored at a type level. Here, a transactional write to a field A::x and a non-transactional load of field A::y may be monitored as accesses to the same data item, i.e. type A. In another embodiment, memory access monitoring/buffering is performed at a field level granularity. Here, a transactional write to A::x and a non-transactional load of A::y are not monitored as accesses to the same data item, as they are references to separate fields. Note, other data structures or programming techniques may be taken into account in tracking memory accesses to data items. As an example, assume that fields x and y of object of class A, i.e. A::x and A::y, point to objects of class B, are initialized to newly allocated objects, and are never written to after initialization. In one embodiment, a transactional write to a field B::z of an object pointed to by A::x are not monitored as memory access to the same data item in regards to a non-transactional load of field B::z of an object pointed to by A::y. Extrapolating from these examples, it is possible to determine that monitors may perform monitoring/buffering at any data granularity level.

In one embodiment, monitors include read monitors and write monitors to track loads and stores, which are determined to be monitored, accordingly. As an example, hardware read monitors and write monitors are to monitor data items at a granularity of the data items despite the granularity of underlying storage structures. In one embodiment, a data item is bounded by tracking mechanisms associated at the granularity of the storage structures to ensure the at least the entire data item is monitored appropriately. An example of utilizing read monitors/attributes to monitor data items is discussed in more detail in co-pending application Ser. No. 12/346,530, entitled "Read and Write Monitoring Attributes in Transactional Memory (TM) Systems," by Gad Sheaffer et al., filed herewith. However, monitors, attributes, annotations, or other tracking mechanisms may be utilized to detect conflicts associated with transactional execution utilizing any granularity of data or structures to hold the data.

Attributes include any logic, firmware, or structure for holding states associated with data items. For example, attributes for a data item include a bit vector, where each bit in the bit vector represents an attribute of a data item, such as transactionally loaded, transactionally written, non-transactionally loaded, non-transactionally written, not transactionally loaded, not transactionally written, not non-transactionally loaded, not non-transactionally written, buffered, not buffered, access conflict detected, no access conflict detected, a read request, no read request, a write request, no write request, an ownership request, no ownership request, or any other attribute or state associated with a data item or memory location to hold the data item. As another example, the attributes for a data item includes an encoded value. For example, states, such as the four states: (1) read monitored; (2) not read monitored; (3) write monitored; (4) not write monitored; (5) buffered; and (6) not buffered, are encoded utilizing three attribute bits, i.e. six binary values of 000, 001, 010, 011, 100, 101, 110.

As yet another example, attributes are included as part of a coherency state array associated with a cache memory, such as data cache 150. A non-exhaustive list of exemplary cache coherency states include: a modified, an exclusive, a shared, or an invalid (MESI) state which are supplemented or augmented with a read monitor attribute, a write monitor attribute, a buffered attribute, another attribute, or a combination thereof As a result, new coherency states are essentially created, such as a read monitored buffered coherency state or a write monitored buffered coherency state. Consequently, existing known coherency and communication/snoop protocols may be utilized in combination with hardware monitors/attributes to detect conflicts.

Based on the design, different combinations of cache coherency requests and monitored coherency states of cache lines result in potential conflicts, such as a cache line holding a data item being in a shared read state and a snoop indicating a write request to the data item. Inversely, a cache line holding a data item being in a buffered write state and an external snoop indicating a read request to the data item may be considered potentially conflicting. In one embodiment, to detect such combinations of access requests and attribute states snoop logic is coupled to conflict detection/reporting logic, such as monitors and/or logic for conflict detection/reporting.

In one embodiment, a handler is registered in hardware to support efficient handling of conflicts, such as access conflicts, loss of monitor conflicts, loss of data conflicts, etc. As an example, a register is modifiable by software, such as transactional runtime or application code, to register an address of a transaction handler. When an event of interest, such as the an access conflict or a loss of information described above, is detected, then in one embodiment, the control flow is vectored to the transactional handler registered in the register without intervention of privileged software, such as an Operating System (OS). A version of registering a handler in hardware is discussed in a related application filed herewith having Ser. No. 12/346,518, entitled "Registering a User-Handler in Hardware for Transactional Memory Event Handling," by Gad Sheaffer et al.

Whether attributes are held has lossy data, i.e. information lost upon an associated eviction from a cache, or as part of data written-back on an eviction, an architecture of processor 100, in one embodiment, supports instructions, operations, or micro-operations to access the attributes. For example, a set monitor instruction is to set an attribute to a specified value, a clear monitor instruction is to clear an attribute to a default value, and a test attribute instruction is to read an attribute. Additionally, specific operations, such as transactional loads and transactional stores, may implicitly set an attribute. For example, a transactional store may implicitly set both a buffering attribute to indicate data is buffered and a write monitoring attribute to indicate the buffered data is write monitored.

In one embodiment, a memory model is provided to support proper ordering of accesses to attributes, which may include explicit or implicit accesses. For example, previously when a first and second load of an attribute is executed out-of-order, an illegal memory ordering scenario may be allowed. To illustrate pseudo code and potential outcomes in an out-of-order execution processor is included below.

```
Set_monitor[M]
R0 = test _monitor[M]
R1 = test _monitor[M]
1) R0 = TRUE and R1 = FALSE is allowed.
2) R0 = FALSE and R1 = TRUE is not allowed.
3) R0 = TRUE and R1 = TRUE is allowed.
4) R0 = FALSE and R1 = FALSE is allowed.
```

Note that in one embodiment, scenarios 1, 3, and 4 are allowed. However, with regard to scenario two assume a read monitor is set to indicate an address M is read monitored before a first test of a read attribute (R0) associated with address M. Furthermore, a cache line associated with address M and the read monitor is evicted before a second test (R1) of the read attribute. Here, if the first and the second test are executed out-of order, then the first test (R0) may return a no read monitoring indication (FALSE) due to the eviction, while the second test returns a read monitoring indication (TRUE). This scenario, in one embodiment, is illegal, and may result in potential inconsistency between the test operations in program order that were executed out of order.

Therefore, in one embodiment, a cache element, such as a cache set, cache line, cache location, or cache entry, is associated with a loss field. As an example, the loss field is included within a portion of a data cache, such that the information is not lost upon an eviction. Here, consistency is provided upon a subsequent access, such as a next load operation, when the loss field is set to a loss value to indicate attribute information has been lost and may be incorrect. To illustrate, the previous example is re-examined. As stated above, the second test operation (R1) is executed first, and subsequently, a loss of the read attribute occurs from the eviction, which results in the loss field being set to the loss value. When the first test operation (R0) subsequently executes out-of-order with the loss field being set, then a conflict is detected. As an example, R0 is faulted in this scenario. In response to the fault, both operations are restarted to ensure the memory model is not broken, i.e. scenario two from above is not allowed In addition to loss of attribute information, other memory consistency violations are potentially present in previous processor architectures, such as inconsistencies caused by attribute access instructions/operations with regard to external accesses. As an example, assume a set read monitor operation associated with address A is to be executed before a load operation of address A. Note, in a scenario where buffering of a read monitor is enabled, then the set read monitor operation may retire and then update the read monitor after the load operation has retired. The time between the load operation's retirement and the actual update of the read attribute is an area of vulnerability.

To illustrate, assume an external snoop is received during this time, where a local processing element believes that the read attribute is set to indicate address A is read monitored; however, the attribute is not marked as of yet, so the external snoop believes address A is not read monitored. Essentially, there is not a consistent view of the read monitor/attributes. Therefore, in one embodiment, in response to a snoop, a store buffer is snooped to determine if a previous store, such as the set read monitor store operation above, is in-flight and has not marked the read attribute. For example, if an entry in the store buffer is hit, i.e. there is an in-flight store to a hardware attribute, then forwarding of the attribute information from the entry, as well as updating the read attribute is prevented.

In addition to the potential consistency problems between attribute access instructions and external accesses, out-of-order execution of attribute accesses potentially also results in consistency issues. For example, take the scenario where a transactional load implicitly sets a read monitor, a test monitor instruction is to subsequently test the read monitor, and the operations are executed out-of-order. As a result, the test monitor instruction may return either monitored or unmonitored based on the timing of executing the operations. A number of memory model implementations may be utilized to alleviate this problem.

As a first example, an operation to set a read monitor, such as a set read monitor operation, blocks/prevents an operation to load the read monitor, such as a test read monitor operation, until the operation to set the read monitor updates the read monitor, accordingly. Therefore, the area of vulnerability described above is avoided, as a subsequent test operation is blocked until the marking of the read monitor occurs. As another example, monitored information is forwarded from instructions that set a monitor to instructions that test the monitor. In addition, buffering of read monitors may be emulated without actually buffering read monitors.

To provide forwarding or perform blocking, a memory order buffer, which may include store and/or load buffers, is to detect dependencies between producer and consumer operations. However, dependency may rely not only on address dependency but also on access type dependency, i.e. an attribute type of producer access and an attribute type of consumer access. Table A below illustrates examples of dependency between attribute access instructions.

TABLE A

| | | Embodiment of dependent attribute access instrutions | | | | | |
|---|---|---|---|---|---|---|---|
| | | producers | | | | | |
| | | Set_Read_Monitor | Set_Write_Monitor | Buffered store | Implicit monitor load | implicit monitored store | implicit buffered store |
| consumers | Test_read_monitor | 1 | 0 | 0 | 0 | 0 | 0 |
| | Test_write_monitor | 0 | 1 | 0 | 0 | 0 | 0 |
| | Test_buffering | 0 | 0 | 1 | 0 | 0 | 0 |
| | load | 0 | 0 | 0 | 0 | 1 | 1 |

Note that the table is not an exhaustive list of instructions/operations and their potential dependencies. Within Table A, a value of 1 represents a dependency exists, which may result in a forwarding or blocking dependency action, as described above. Discussion of structures to support forwarding or blocking are discussed in reference to FIGS. 3-4 below. Once dependency is detected, then it is determined if the information from the producer should be forwarded or the consumer should be blocked until the producer is done updating an attribute with the information.

As stated above in the initial reference to FIG. 1, the architecture of processor 100 is purely illustrative for purpose of discussion. Similarly, the specific examples of associating attributes with data items/elements is also exemplary, as any method of associating hardware monitors/attributes at different granularity data items may be utilized.

Figure 2:
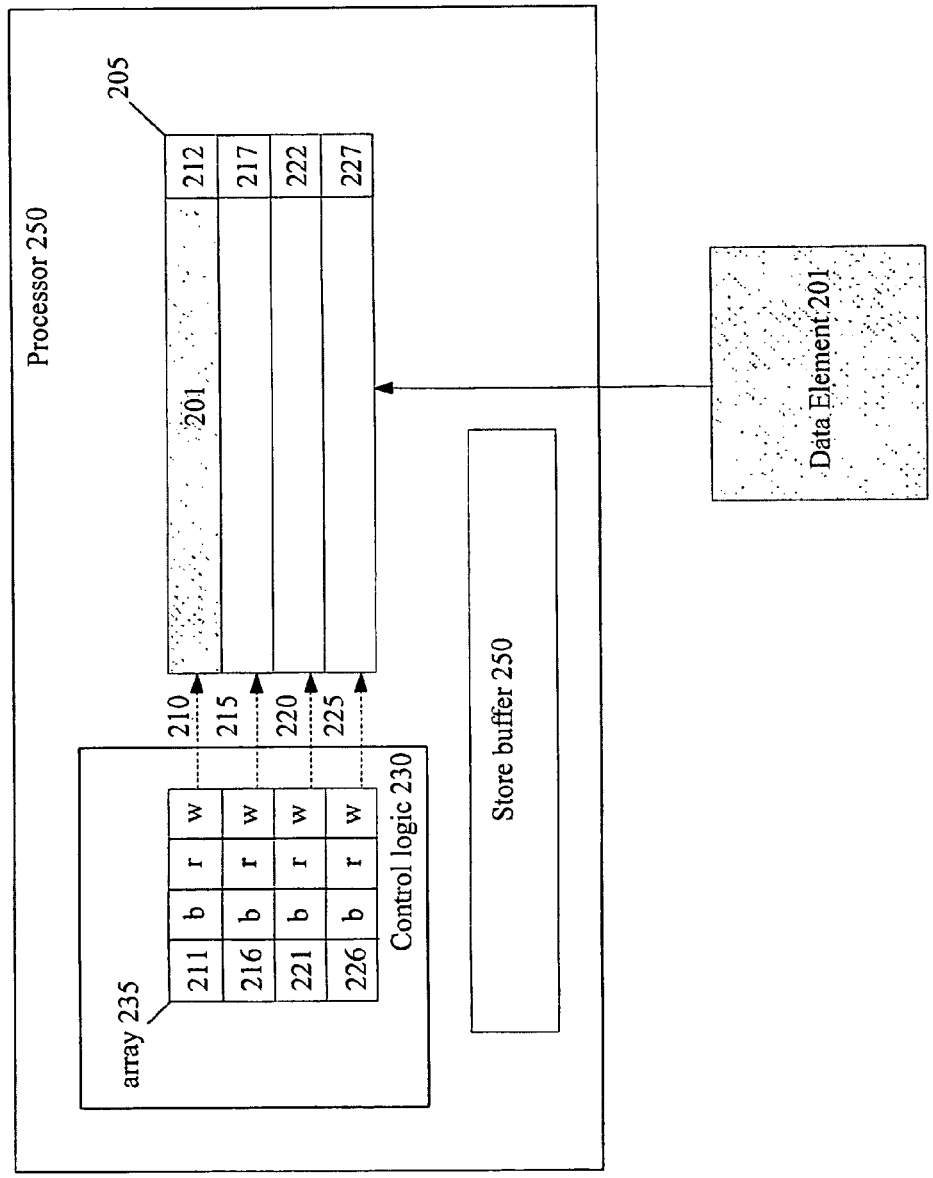
FIG. 2 illustrates an embodiment of a processor including structures to support memory ordering for accesses to hardware attributes.

Referring to FIG. 2, an embodiment of a processor including structures to implement a memory model to support hardware attributes for transactional execution is illustrated. Processor 250 includes any type of known processor with any number of processing elements capable of transactional execution. Although not illustrated, processor 250 may be coupled to other system components, such as a chipset, i.e. memory controller hub and input/output (I/O) controller hub, and system memory. Common examples of I/O devices in a computer system include a network controller, a video display adapter, a graphics processor, an audio controller, or other input/output device.

In one embodiment, processor 250 includes a cache memory. The most common example of a cache includes a data cache, such as a first level cache or second level cache as illustrated in FIG. 1. However, a cache may also include an instruction cache, trace cache, or other known cache. Although cache architecture is not described in detail to avoid unnecessarily obscuring the discussion, a cache may be organized in numerous ways. For example, a cache may be fully associative, i.e. memory addresses may be held anywhere in the cache, set associative where certain ranges of memory addresses are restricted to specific sets of the cache, or direct mapped cache where multiple addresses are to be held in single locations within the cache. Note that the methods and apparatus described herein may be implemented with any cache organization.

As illustrated, the cache includes data portion 205, which may also be referred to as cache memory or a data array, and control logic 230 associated with cache memory 205. Cache memory 205 includes elements 210, 215, 220, and 225. A cache element, as utilized herein, refers to any granularity of a structural element of a cache, such as a cache line, a cache entry, a cache location, or a cache set. For example, element 210 may include a cache set having a number of lines for a set associative cache. In contrast, element 210, in another embodiment, includes an entry of a plurality of entries within a set that is associated with array 235 in a similar manner.

Control logic 230 includes array 235 having entries 211, 216, 221, and 226 associated with/corresponding to cache elements 210, 215, 220, and 225, respectively. Furthermore, hardware read attributes, write attributes, and buffering attributes 211*r*, 211*w*, 211*b*, 216*r*, 216*w*, 216*b*, 221*r*, 221*w*, 221*b*, 226*r*, 226*w* and 226*b* are similarly associated with cache elements 210, 215, 220, and 225. Although hardware monitors and their various embodiments are described in more detail within a co-pending application filed herewith having Ser. No. 12/346,530, entitled "Read and Write Monitoring Attributes in Transactional Memory (TM) Systems," by Gad Sheaffer et al., embodiments of attributes are briefly described herein to further the discussion.

In one embodiment, read and write monitors are to bound monitoring of data, such as data item 201, despite a granularity of the physical structures to hold the data. Note from the discussion above that a data item may have any granularity. In fact, a programmer may define a data item by providing a starting address and then a number of additional bytes that make up the data item. Here, it is assumed that element 210 includes a line of cache. As a result, the data item may be smaller than a line, such as line 210, of cache 205, the size of a cache line of cache 205, or bigger than a cache line of cache 205, as well as potentially unaligned with the starting and ending boundaries of a cache line of cache 205.

In the example of FIG. 2, data item 201 spans a single cache line. Although P29130 discusses potential dynamic assignment of monitoring attributes, attributes 211*r*, 211*w*, 211*b*, 216*r*, 216*w*, 216*b*, 221*r*, 221*w*, 221*b*, 226*r*, 226*w* and 226*b* are provided, in this example, on a cache element basis. Therefore, if data item 201 is to be read monitored, then read monitor 211*r* is updated to a monitored state to indicate corresponding elements 211 are read monitored.

In one embodiment, attributes 211*r*, 211*w*, 211*b*, 216*r*, 216*w*, 216*b*, 221*r*, 221*w*, 221*b*, 226*r*, 226*w* and 226*b* are considered lossy data. Often, lossy data refers to local data, which may be lost upon an event, such as an eviction of at least a portion of cache element 210 and a write-back to a higher level cache. In one embodiment, array 235 includes a coherency state array, where entries 211, 216, 221, and 226 are coherency entries to hold coherency state values corresponding to cache elements 210, 215, 220, and 225, respectively. Common cache coherency states include MESI, i.e. Modified Exclusive Shared and Invalid, cache coherency states. However, addition of the illustrated three attribute bits essentially create new coherency states based on read monitoring, write monitoring, and buffering.

Therefore, assuming cache element 210 includes a cache line, then in response to an eviction of cache line 210, the associated state information including entry 211 having attributes 211*b*, 211*r*, and 211*w* is lost, i.e. not written back. As a result, a consistency problem may occur when a local element believes an attribute is set, but the attribute has been lost. Here, the consistency problem may occur with another attribute access or an external access, since the proper information has been lost.

Therefore, in one embodiment, loss fields 212, 217, 222, and 227 are associated with elements 210, 215, 220, and 225, respectively. As illustrated, loss fields 212, 217, 222, and 227 are included within elements 210, 215, 220, and 225. However, a loss field may be held anywhere that is not lost upon an eviction. For example, loss field 212 may be included in a data cache structure that is not lost upon eviction of line 210, or that may be easily logged and associated with cache line 210.

Typically, control logic 230 includes snoop logic, replacement logic, state logic, and other cache related logic to perform any known cache operations. In one embodiment, control logic 230, either individually or in conjunction with other logic in processor 250, is to update a loss field to a loss value in response to determining associated lossy data is to be lost. For example, assume lossy data includes attributes 211*b*, 211*r*, and 211*w* in a coherency entry 211. Here, when an attribute, such as 211*b*, is set and cache element 210 is selected for eviction, control logic 230 updates loss field 212. Note in one embodiment, when no data is to be lost, i.e. lossy data is not present, such as attributes 211*b*, 211*r*, and 211*w* not being set, then an eviction does not result in setting of loss field 212. In other words, there is no reason to indicate a loss if there is no data to lose.

In one embodiment, a handler may be invoked, as described above, to handle the loss. However, in another embodiment, consistency is ensured upon a subsequent access. For example, assume a transactional load results in attribute 211.*r* being set to indicate read monitoring, and then subsequently, line 210 is selected for eviction. As a result, control logic 230 sets loss field 212 to a loss value. Here, a version of address hashing may be utilized, as after eviction, the address of entry 210 is different. Before eviction either lossy data, such as the tag for line 210 is stored separately, or information that is the same between an evicted line and a newly allocated line is utilized for loss field 212, such as set bits for a cache array that is not fully associative. Previously, without loss field 212, a subsequent load, such as test monitor operation, would receive incorrect monitor information from 211.*b*, since it was lost during the eviction. Instead, in one embodiment, the subsequent test read monitor operation is faulted in response to the loss value being held in field 212. Consequently, consistency is ensured through the next access operation.

Figure 3:
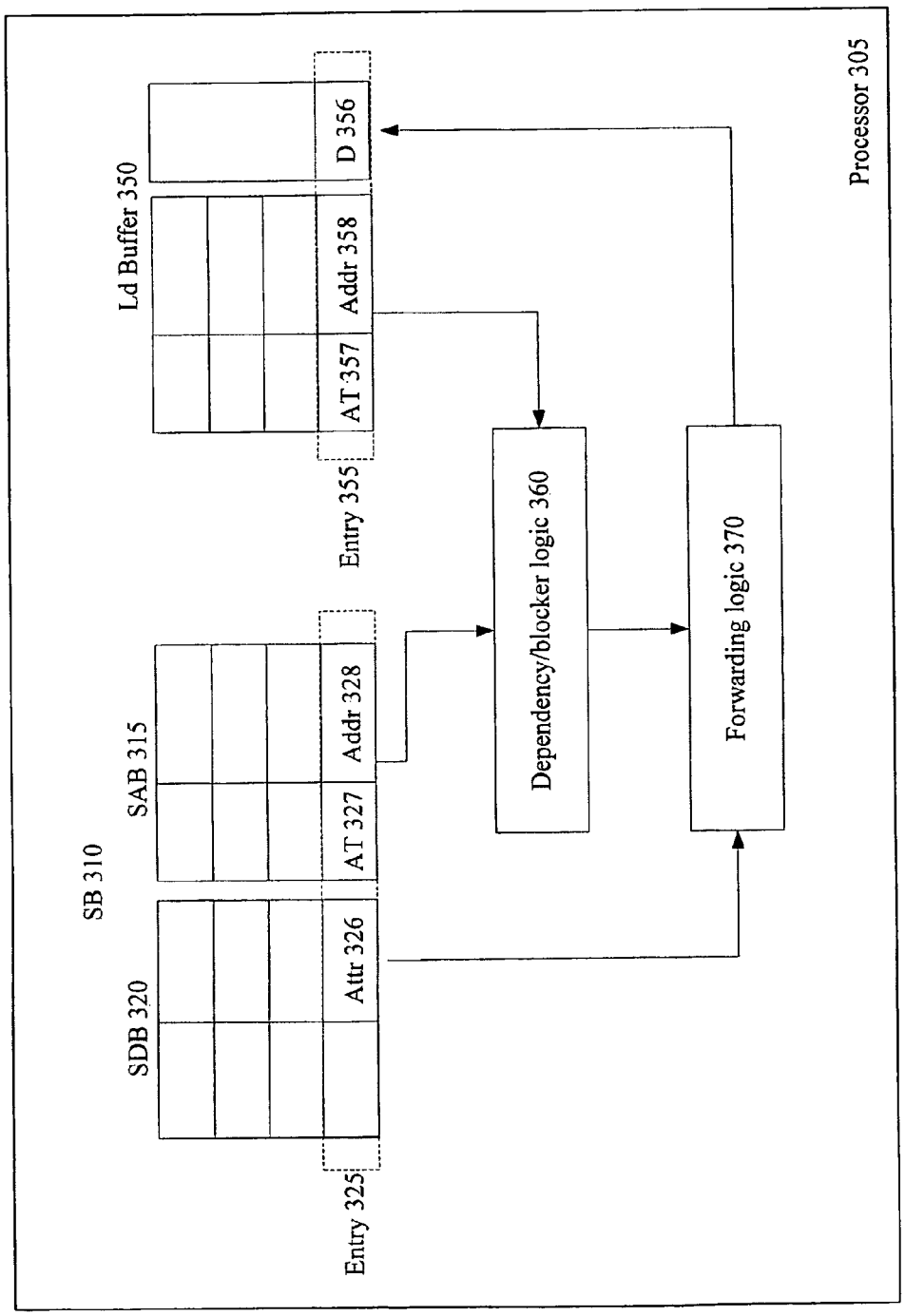
FIG. 3 illustrates another embodiment of a processor including structures to support memory ordering for accesses to hardware attributes.

Turning to FIG. 3 an embodiment of a processor including structures to support memory ordering for accesses to hardware attributes is illustrated. Note that only a select few structures of a processor are illustrated for simplicity. In one embodiment, logic is included in processor 305 to determine if a dependency exists between a store operation to a hardware attribute and a subsequent load operation to a hardware attribute, such that a proper dependency action may be performed.

As an example, determining a dependency between producer and consumer operations is based on attribute access types. As stated above, exemplary attributes include a read monitor, a write monitor, and a buffering attribute. Here, associated access types include a read monitor access type, a write monitor access type, and a buffering access type. Previously, store forwarding has been implemented purely on address dependency.

However, in on embodiment, access types of producer and consumer operations in conjunction with addresses of the producer and consumer operations are utilized in determining a dependency. As discussed above in reference to Table A, different types of accesses to the same address may not be dependent. As a result, in one embodiment, a dependency does not exist between a set write monitor access type and a test read monitor access type.

One embodiment of determining dependency based on access types of operations is depicted in FIG. 3. Here, a memory order buffer, not specifically illustrated, potentially includes store buffer 310 and load buffer 350. Both buffers are to hold entries associated with corresponding operations. As illustrated, entry 325 is to be associated with a store operation referencing address 328 having attribute access type 327 to store attribute data 326. Although the store buffer is illustrated for exemplary purposes as having two separate arrays, i.e. store data buffer 320 and store address buffer 315, any known implementation of a store buffer may be utilized.

Essentially, store buffer logic 310 holds attribute access type 327 associated with a store operation, i.e. within store address buffer 315 of store buffer entry 325. Load buffer 350 operates in a similar manner with respect to load operations. As depicted, entry 355 holds address 358 associated with access type 357 and data entry 356. To illustrate, assume that entry 325 is associated with a previous in-flight store operation, such as a set read monitor operation, to update an hardware attribute, such as a read monitor attribute, with updated attribute information 326. Subsequently, a load operation is encountered. Here, buffer entry 355 is associated with the subsequent load operation.

Dependency/blocker logic 360 compares access type 357 and address 358 of the subsequent load operation with access type 327 and address 328 of the previous store operation. In one embodiment, the comparison is performed in a searching manner, i.e. access type 357 is appended to address 358 to search store address buffer 315. If the entire appended search criteria hits an entry in store buffer 310, then a dependency exists. Here, if the combination of access type 357 appended to address 358 matches access type 337 appended to address 338, then it is determined a dependency exists between the store operation and the subsequent load operation.

In other words, the access types, i.e. a read monitor, write monitor, or buffer access type, match and the addresses match, so a dependency exists between the producer store operation and consumer subsequent load operation. Note that in one embodiment, subsequent refers to program order, such that a search of store buffer 310 is only made of store buffer entries before the load buffer entry in program order.

In addition, forwarding logic 370 is coupled to dependency/blocker logic 360, which either separately or in conjunction with dependency/blocker logic, is to perform a dependency action, accordingly. In one embodiment, the dependency action includes a blocking action. As one example, read monitors may not be forwarded. As a result, if the access types include read monitor access types and a dependency is detected, then the subsequent load operation is blocked until the store operation associated with entry 325 updates the appropriate read monitor for address 328 to updated attribute information 326. As an example, blocking logic 360 includes logic to update a blocking field within load buffer entry 355 to a blocking value. Based on the blocking field holding the blocking value in entry 355, the load is not dispatched until the blocking value is cleared.

In contrast, another dependency action includes forwarding monitor data. Here, if a dependency is determined by dependency logic 360, then logic 370 is to forward updated data 326 to the load operation. Yet, if dependency logic 360 determines there is no dependency, then no dependency action is undertaken. However, where forwarding of monitor data is allowed, then in one embodiment, snoop logic is to snoop store buffer 310 in response to an external access request. Here, if an external access request results in snoop hit, such as a hit of entry 325, then forwarding logic 370 is not to forward updated attribute data 326. Furthermore, the store operation, such as a set monitor operation, may not be allowed to update a corresponding monitor in response to the hit of the external snoop.

Figure 4:
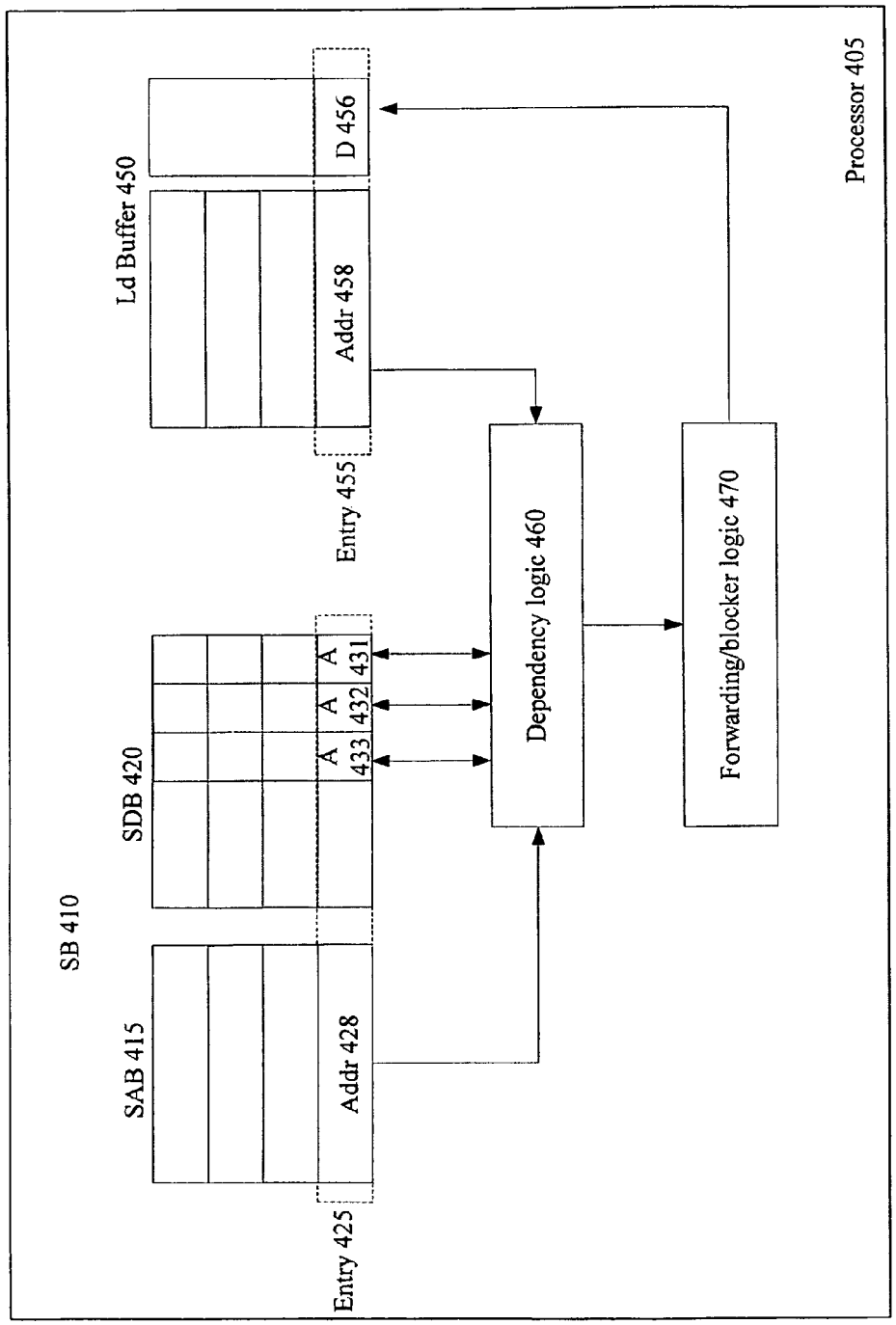
FIG. 4 illustrates another embodiment of a processor including structures to support memory ordering for accesses to hardware attributes.

Referring to FIG. 4 another embodiment of determining dependency between attribute access operations is illustrated. Note in FIG. 3, that an explicit attribute access type, such as a type specified by consideration of an opcode, is associated with a store entry. There, the access type is essentially an extension of the address, such as a 2-bit extension to represent the three states described above. Furthermore, dependency checking included a search/compare with the 2-bit extension as part of the address.

In contrast, dependency checking based on access type, in one embodiment, is implicit. As depicted, similar structures are included in processor 405, as to those shown in processor 305 from FIG. 3. However, instead of generic updated attribute information, which may include read monitor, write monitor, or buffering attribute information, held in one position of an entry of store buffer 320, attribute information is held in positions 431, 432, and 433. As a result, a traditional address dependency check may be performed with an additional check of the position of attribute information.

To illustrate, assume attribute information position 431 is to hold read monitor information, attribute information position 432 is to hold write monitor information, and attribute information position 433 is to hold buffering attribute information. When a load is encountered a traditional address dependency check is performed, i.e. address 458 is utilized to search store address buffer 415. When a hit occurs to entry 425, i.e. address 458 and 428 match, then the access type is compared based on the position of data held in the store buffer 420. In one embodiment, access type comparison may be performed in parallel to an address match. Therefore, it is further assumed, that a set buffering attribute operation is associated with entry 425. As a result, the updated attribute information for the buffering attribute associated with address 428 is held in position 433, such as a third least significant bit.

Upon a subsequent load, such as a test write monitor operation, the addresses are compared by dependency logic 460. Since, the test write monitor operation is of a write monitor access type and buffer entry 425 holds the update information in position 433 indicating a buffering access type, then there is no dependency match. However, if the subsequent load is a test buffered attribute operation with the addresses matching, then the access types based on the position of information in store data buffer entry 425 are matching and a dependency is determined to exist. As a result of either determining a dependency exists or does not exist, forwarding/blocking logic 470 performs similar operations as those described above in reference to FIG. 3.

Figure 5:
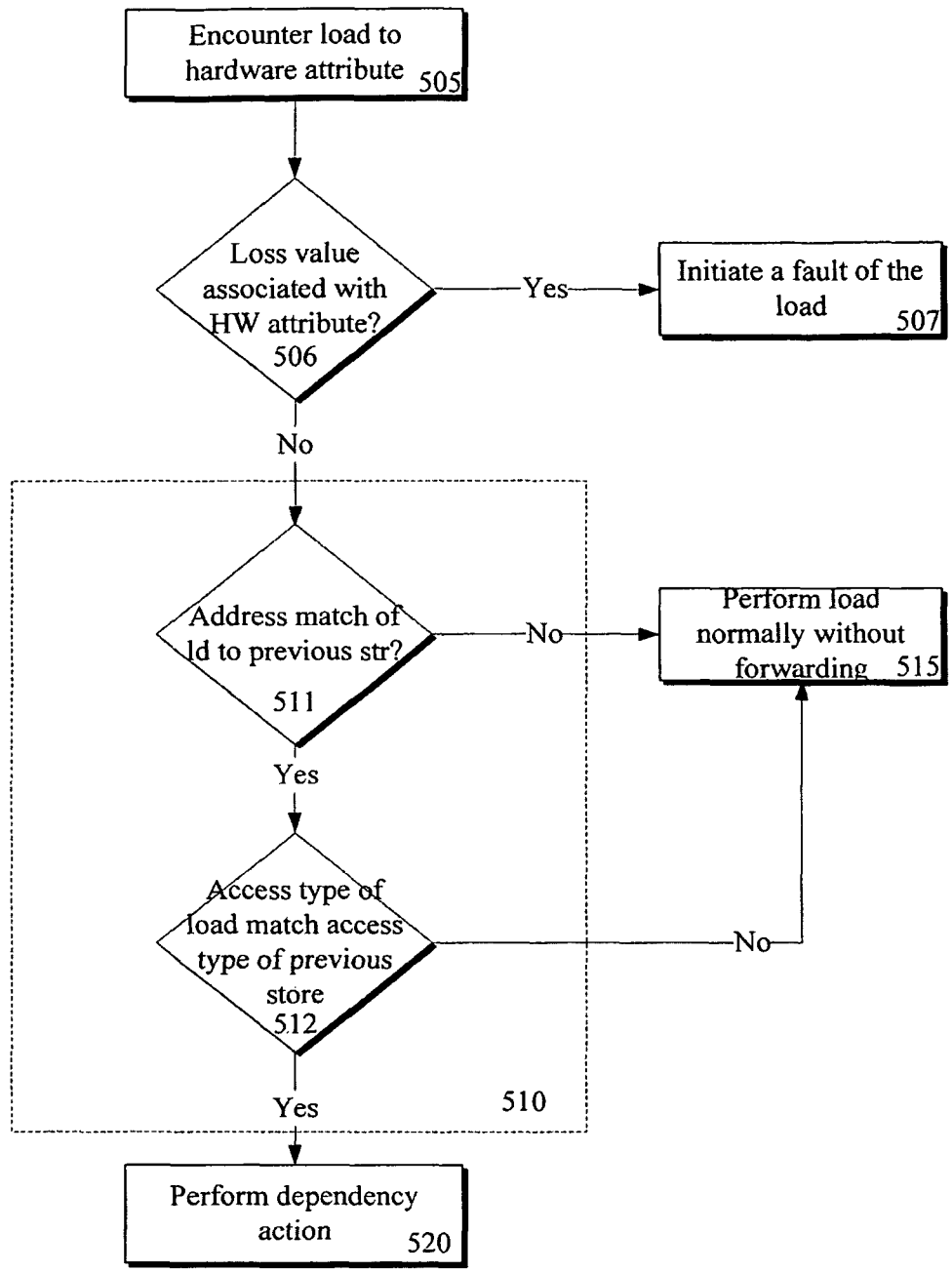
FIG. 5 illustrates an embodiment of a flow diagram for a method of providing proper memory ordering upon a read of a hardware attribute.

Turning to FIG. 5, an embodiment of a flow diagram for a method of providing proper memory ordering upon a read, load, or test of a hardware attribute is illustrated. Note the flowchart of FIG. 5 is illustrated in a substantially serial fashion. However, the methods illustrated and described in relation to this figure are not so limited, as they may occur in any order, as well as being performed at least partially in parallel.

In flow 505, a load a load operation to read a hardware attribute is encountered. As an example, the load operation includes a test monitor instruction, operation, or micro-operation, which may be included in larger instructions to perform other operations/micro-operations as well. In one example, the load operation is associated with an attribute type and references an address associated with a hardware attribute. As described above, examples of hardware attributes include a read monitor attribute, a write monitor attribute, and a buffering attribute. Yet, an attribute may include any storage of a state associated with data or an address.

In flow 506, it is determined if a loss field associated with the hardware attribute, i.e. the address referenced by the load operation that is associated with the hardware attribute, is set to a loss value. In response to the field holding a loss value to indicate lossy data, such as attribute information, has been lost, then a fault is initiated for the load operation in flow 507 to ensure proper data consistency.

However, if the loss field does not hold a loss value, then the flow continues to flow 510. In flow 510, it is determined if a dependency exists between the load operation and a previous in-flight store operation, such as a set hardware attribute instruction, operations, or micro-operation. Note that flow 510 encompasses both flows 511 and 512, as the dependency check includes both of these flows in this example.

In flow 511, it is determined if there is an address match between the load operation and the previous in-flight store operation, and in flow 512, it is determined if there is an access type match between the load operation and the previous in-flight store operation. In one embodiment, these flows are performed together, such as when an access type is held as an address extension, which is described in FIG. 3. Here, a store address buffer is searched with a representation of the attribute type, i.e. the address bit extension, appended to the address. If a hit occurs with the access type appended to the address, then it is determined that a dependency exists, since the both the addresses and access types of the load operation and the previous store operation match.

In another embodiment, where access type is implicit within a design, such as based on position of store data described in reference to FIG. 4, then flows 511 and 512 may be performed separately. Here, a store buffer is searched for a store buffer entry associated with the address referenced by the load for flow 511. In response to a hit, i.e. an address match, then a position of store data held in the hit store buffer entry of the store buffer is determined. Based on the position of the store data, such as a third least significant bit (LSB), a store attribute type, such as a buffering, read monitoring, or write monitoring type is determined. If the determined store access type is the same as the load type, then it is determined that a dependency exits.

In either case, if a dependency does not exists, then in flow 515, the load is performed normally without performing an attribute related dependency action. However, if a dependency is detected, then in flow 520, an appropriate dependency action is performed. In one embodiment, the dependency action includes forwarding the store data associated with the in-flight previous store operation. Here, if the previous store operation includes a set write monitor operation to update a write monitor with an updated value, then the updated value is forwarded to a dependent test monitor operation to read the write monitor value.

In another embodiment, a dependency action includes blocking the load operation until the hardware attribute is updated by the in-flight previous store operation. To illustrate, assume the previous store includes a set read monitor operation to update the read monitor to an updated value and the load operation includes a test read monitor operation to load the read monitor value. Here, the load operation to load the read monitor value is blocked until the set read monitor operation actually updates the read monitor. In either case, i.e. forwarding or blocking, data consistency is maintained through the provided memory model.

A module as used herein refers to any hardware, software, firmware, or a combination thereof. Often module boundaries that are illustrated as separate commonly vary and potentially overlap. For example, a first and a second module may share hardware, software, firmware, or a combination thereof, while potentially retaining some independent hardware, software, or firmware. In one embodiment, use of the term logic includes hardware, such as transistors, registers, or other hardware, such as programmable logic devices. However, in another embodiment, logic also includes software or code integrated with hardware, such as firmware or micro-code.

A value, as used herein, includes any known representation of a number, a state, a logical state, or a binary logical state. Often, the use of logic levels, logic values, or logical values is also referred to as 1's and 0's, which simply represents binary logic states. For example, a 1 refers to a high logic level and 0 refers to a low logic level. In one embodiment, a storage cell, such as a transistor or flash cell, may be capable of holding a single logical value or multiple logical values. However, other representations of values in computer systems have been used. For example the decimal number ten may also be represented as a binary value of 1010 and a hexadecimal letter A. Therefore, a value includes any representation of information capable of being held in a computer system.

Moreover, states may be represented by values or portions of values. As an example, a first value, such as a logical one, may represent a default or initial state, while a second value, such as a logical zero, may represent a non-default state. In addition, the terms reset and set, in one embodiment, refer to a default and an updated value or state, respectively. For example, a default value potentially includes a high logical value, i.e. reset, while an updated value potentially includes a low logical value, i.e. set. Note that any combination of values may be utilized to represent any number of states.

The embodiments of methods, hardware, software, firmware or code set forth above may be implemented via instructions or code stored on a machine-accessible or machine readable medium which are executable by a processing element. A machine-accessible/readable medium includes any mechanism that provides (i.e., stores and/or transmits) information in a form readable by a machine, such as a computer or electronic system. For example, a machine-accessible medium includes random-access memory (RAM), such as static RAM (SRAM) or dynamic RAM (DRAM); ROM; magnetic or optical storage medium; flash memory devices; electrical storage device, optical storage devices, acoustical storage devices or other form of propagated signal (e.g., carrier waves, infrared signals, digital signals) storage device; etc. For example, a machine may access a storage device through receiving a propagated signal, such as a carrier wave, from a medium capable of holding the information to be transmitted on the propagated signal.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

In the foregoing specification, a detailed description has been given with reference to specific exemplary embodiments. It will, however, be evident that various modifications and changes may be made thereto without departing from the broader spirit and scope of the invention as set forth in the appended claims. The specification and drawings are, accordingly, to be regarded in an illustrative sense rather than a restrictive sense. Furthermore, the foregoing use of embodiment and other exemplarily language does not necessarily refer to the same embodiment or the same example, but may refer to different and distinct embodiments, as well as potentially the same embodiment.

What is claimed is:

1. A method comprising:
   encountering a load operation to read a hardware attribute, the load operation being associated with an attribute type and referencing an address associated with a hardware attribute of the attribute type;
   searching a store address buffer with a representation of the attribute type appended to the address;
   determining the in-flight previous store operation is associated with the attribute type and references the address associated with the hardware attribute in response to finding a store address buffer entry of the store address buffer holding the representation of the attribute type appended to the address; and
   performing a dependency action in response to determining the in-flight previous store operation is associated with the attribute type and references the address associated with the hardware attribute.

2. The method of claim 1, wherein the load operation includes a test a hardware attribute operation, and wherein the in-flight previous store operation includes a set a hardware attribute operation.

3. The method of claim 1, wherein the attribute type is selected from a group consisting of a read monitor attribute type, a write monitor attribute type, and a buffering attribute type.

4. The method of claim 1, wherein performing a dependency action comprises forwarding store data associated with the in-flight previous store operation.

5. The method of claim 1, wherein performing a dependency action comprises blocking the load operation until the hardware attribute is updated by the in-flight previous store operation.

6. The method of claim 1, further comprising updating a loss field associated with the hardware attribute to a loss value in response to an eviction of a cache location associated with the hardware attribute, which is to result in loss of the hardware attribute.

7. The method of claim 6, wherein the load operation is faulted in response to encountering the load operation to read the hardware attribute and the loss field holding the loss value.

8. A method comprising:
   encountering a load operation to read a hardware attribute, the load operation being associated with an attribute type and referencing an address associated with a hardware attribute of the attribute type;
   searching a store buffer for a store buffer entry associated with the address;
   determining a position of store data associated with the hardware attribute held in a store buffer entry of the store buffer in response to finding the store buffer entry associated with the address;
   determining a store attribute type based on the position of the store data held in the store buffer entry;
   determining the in-flight previous store operation is associated with the attribute type and references the address associated with the hardware attribute in response to determining the store attribute type is the same as the attribute type associated with the load operation; and
   performing a dependency action in response to determining the in-flight previous store operation is associated with the attribute type and references the address associated with the hardware attribute.

9. The method of claim 8, wherein the load operation includes a test a hardware attribute operation, and wherein the in-flight previous store operation includes a set a hardware attribute operation.

10. The method of claim 8, wherein the attribute type is selected from a group consisting of a read monitor attribute type, a write monitor attribute type, and a buffering attribute type.

11. The method of claim 8, wherein performing a dependency action comprises forwarding store data associated with the in-flight previous store operation.

12. The method of claim 8, wherein performing a dependency action comprises blocking the load operation until the hardware attribute is updated by the in-flight previous store operation.

13. A method comprising:
    encountering a load operation to read a hardware attribute, the load operation being associated with an attribute type and referencing an address associated with a hardware attribute of the attribute type;
    determining if an in-flight previous store operation is associated with the attribute type and references the address associated with the hardware attribute;
    performing a dependency action in response to determining the in-flight previous store operation is associated with the attribute type and references the address associated with the hardware attribute; and
    updating a loss field associated with the hardware attribute to a loss value in response to an eviction of a cache location associated with the hardware attribute, which is to result in loss of the hardware attribute.

14. The method of claim 13, wherein the load operation includes a test a hardware attribute operation, and wherein the in-flight previous store operation includes a set a hardware attribute operation.

15. The method of claim 13, wherein the attribute type is selected from a group consisting of a read monitor attribute type, a write monitor attribute type, and a buffering attribute type.

16. The method of claim 13, wherein determining if an in-flight previous store operation is associated with the attribute type and references the address associated with the hardware attribute comprises searching a store address buffer with a representation of the attribute type appended to the address and determining the in-flight previous store operation is associated with the attribute type and references the address associated with the hardware attribute in response to finding a store address buffer entry of the store address buffer holding the representation of the attribute type appended to the address.

17. The method of claim 13, wherein determining if an in-flight previous store operation is associated with the attribute type and references the address associated with the hardware attribute comprises:
    searching a store buffer for a store buffer entry associated with the address;
    determining a position of store data associated with the hardware attribute held in a store buffer entry of the store buffer in response to finding the store buffer entry associated with the address;
    determining a store attribute type based on the position of the store data held in the store buffer entry; and
    determining the in-flight previous store operation is associated with the attribute type and references the address associated with the hardware attribute in response to determining the store attribute type is the same as the attribute type associated with the load operation.

18. The method of claim 13, wherein performing a dependency action comprises forwarding store data associated with the in-flight previous store operation.

19. The method of claim 13, wherein performing a dependency action comprises blocking the load operation until the hardware attribute is updated by the in-flight previous store operation.

20. The method of claim 13, wherein the load operation is faulted in response to encountering the load operation to read the hardware attribute and the loss field holding the loss value.

21. An apparatus comprising:
    a plurality of hardware attributes to be associated with a cache element of a cache memory;
    store buffer logic configured to hold a reference to a store operation associated with a first attibute access type, wherein the store operation is to update at least one of the plurality of hardware attributes;
    dependency logic coupled to the store buffer logic, the dependency logic configured to compare at least the first attribute access type and a second attributed access type to be associated with a subsequent load operation to at least one of the plurality of hardware attributes and to determine if a dependency exists between the store operation and the subsequent load operation based on at least the dependency logic comparing the first attribute access type and the second attribute access type; and
    forwarding logic coupled to the logic, the forwarding logic to forward updated attribute data of the store operation to the subsequent load operation in response to determining the dependency exists between the store operation and the subsequent load operation.

22. The apparatus of claim 21, wherein the first attribute access type and the second attribute access type are each individually selected from a read monitor access type, a write monitor access type, and a buffering access type.

23. The apparatus of claim 21, wherein the store buffer logic configured to hold the first attribute access type associated with the reference to the store operation comprises store address buffer logic to hold the first attribute access type appended to a store address associated with the store operation, and wherein the dependency logic configured to compare at least the first attribute access type and the second attribute access type comprises the dependency logic to compare the first attribute access type appended to the store address and the second access type appended to a load address associated with the subsequent load.

24. The apparatus of claim 23, further comprising snoop logic to snoop the store buffer in response to an external access request, wherein the forwarding logic is not to forward the updated attribute data in response to the external access request referencing the store address.

25. The apparatus of claim 23, wherein the dependency logic is further to determine the dependency exists between the store operation and the subsequent load operation in response to the first attribute access type appended to the store address matching the second access type appended to the load address.

26. The apparatus of claim 25, wherein the dependency logic is further to determine the dependency does not exist between the store operation and the subsequent load operation in response to the first attribute access type appended to the store address not matching the second access type appended to the load address, and wherein the forwarding logic is not to forward the updated attribute data in response to the dependency logic determining the dependency does not exist between the store operation and the subsequent load operation.

27. The apparatus of claim 21, wherein the store buffer logic configured to hold a reference to a store operation associated with a first attibute access type comprises: the store buffer logic being configured to hold store data in a a store buffer entry associated with the store operation, wherein the position of the store data in the store buffer entry represents the first attribute access type.

28. The apparatus of claim 27, wherein the dependency logic configured to determine if a dependency exists between the store operation and the subsequent load operation based on the dependency logic comparing the first attribute access type and the second attribute access type comprises: the dependency logic being configured to determine the dependency exists between the store operation and the subsequent load operation in response to a store address associated with the store operation matching a load address associated with the subsequent load operation and the second attribute access type being the same as the first attribute access type based on the position of the store data.

29. The apparatus of claim 28, wherein the dependency logic is to determine the dependency does not exist between the store operation and the subsequent load operation in response to the store address associated with the store operation not matching the load address associated with the subsequent load operation or the second attribute access type not being the same as the first attribute access type based on the position of the store data held in the store data buffer entry, and wherein the forwarding logic is to not forward the store data in response to the dependency logic determining the dependency does not exist between the store operation and the subsequent load operation.

* * * * *

UNITED STATES PATENT AND TRADEMARK OFFICE
CERTIFICATE OF CORRECTION

PATENT NO.        : 8,627,014 B2
APPLICATION NO.   : 12/346539
DATED             : January 7, 2014
INVENTOR(S)       : Scheaffer et al.

It is certified that error appears in the above-identified patent and that said Letters Patent is hereby corrected as shown below:

In the Claims

In column 19, at line 35 delete, "attibute" and insert --attribute--.

In column 20, at line 30 delete, "attibute" and insert --attribute--.

In column 20, at line 31 delete, "hold store data in a a store" and insert --hold store data in a store--.

Signed and Sealed this
Eleventh Day of November, 2014

Michelle K. Lee
*Deputy Director of the United States Patent and Trademark Office*